Aug. 26, 1930.                G. BENDIXEN                1,774,413
              ANTIGLARE DEVICE FOR AUTOMOBILE HEADLIGHTS
                          Filed July 11, 1929
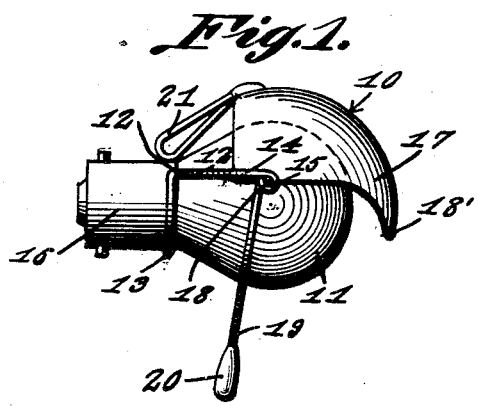
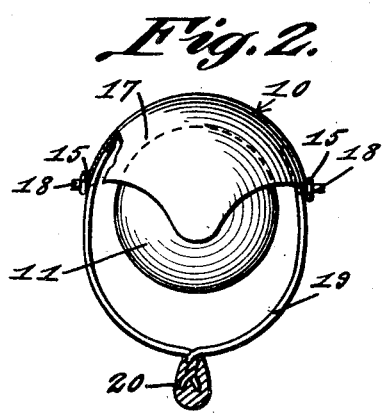
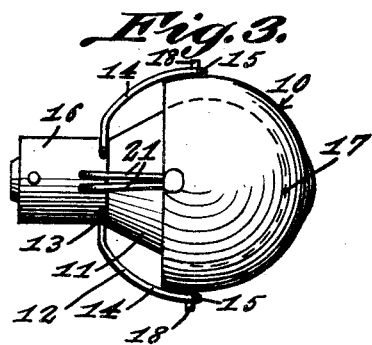
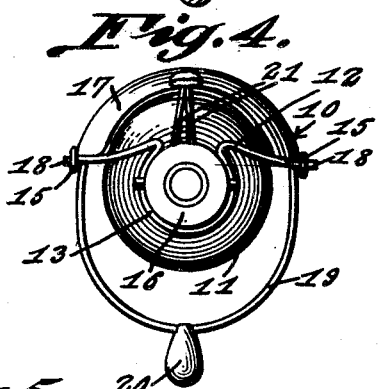
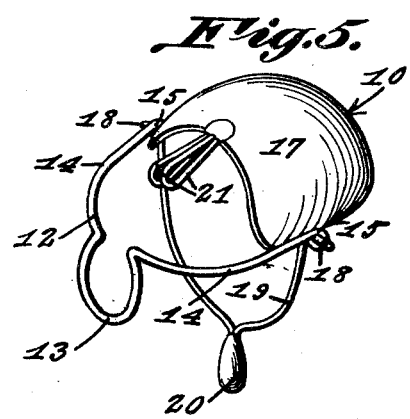
George Bendixen, INVENTOR
BY Victor J. Evans
ATTORNEY Patented Aug. 26, 1930

1,774,413

UNITED STATES PATENT OFFICE

GEORGE BENDIXEN, OF MOUNTAIN LAKES, NEW JERSEY

ANTIGLARE DEVICE FOR AUTOMOBILE HEADLIGHTS

Application filed July 11, 1929. Serial No. 377,493.

This invention relates to improvements in antiglare devices for automobile headlights.

The primary object of the invention resides in a shield or glare eliminator for attachment to the electric lamp of an automobile headlight which prevents the spread of light rays and confines the same to the roadway so as not to annoy or interfere with the vision of the driver of a forwardly approaching automobile.

Another object of the invention is the provision of a shield which is pivotally mounted upon an electric lamp of a front headlight and which is weighted so as to assure a horizontal position at all times, irrespective of whether an automobile equipped therewith is ascending or descending a hill whereby the usual glare is shielded.

A further object of the invention is to provide an anti-glare device or shield which may be secured to the electric lamp of a headlight now in use without altering the construction of the lamp or headlight.

With these and other objects in view, the invention resides in certain novel construction and combination and arrangement of parts, the essential features of which are hereinafter fully described, are particularly pointed out in the appended claims, and are illustrated in the accompanying drawing, in which:—

Figure 1 is a side elevation of a headlight electric lamp with my anti-glare shield mounted thereon.

Figure 2 is a front elevational view.

Figure 3 is a top plan view.

Figure 4 is a rear view.

Figure 5 is a perspective view of the shield per se.

Referring to the drawing by reference characters, the numeral 10 designates my improved anti-glare shield in its entirety and which is shown in Figures 1 to 4 inclusive as attached to the electric lamp or bulb 11 of an automobile headlight.

The shield includes a wire supporting frame 12 formed of a single length of resilient wire and bent midway between its ends to provide an attaching eye 13, and forwardly curved arms 14 which terminate in aligned eyes 15. The eye 13 is separated and resilient to enable the same to be snapped onto the base 16 of the lamp 11 for clamping engagement therewith so that the arms 14 co-act to provide a yoke which extends forward adjacent the globe of the lamp.

Pivotally supported by the frame 12 is a shield member 17 which is rounded to a degree equal to the curvature of the globe and which is provided at diametrically opposite points with trunnions 18 which have their bearings in the eyes 15. The rear edge of the shield member terminates in spaced relation to the forward end of the base 16 to allow light rays from the lamp to pass upward and rearwardly to the reflector of the headlight, while the front of the shield member is formed with a central downwardly extending nose 18' which when the lamp is on a horizontal plane as shown in the drawings, is disposed directly in the plane of the filament of the lamp. The glare of the filament is therefore arrested as it cannot be seen forwardly of the lamp when the lamp is tilted downward or upward when an automobile is descending or ascending a hill for the reason now to be explained.

Fixed to diametrically opposed sides of the shield member are the ends of a substantially U-shape bail 19 which supports a depending weight 20 at the center of its bight portion. It will be appreciated that the weight 20 tends to properly balance the shield to always hold the same in shielding position.

The forward end of the shield member is prevented from upward swinging by reason of a wire resilient stop member 21 which is fixed to the rear edge and lightly engages the glass globe of the lamp. When descending a hill, the shield member is held against upward swinging to confine the light rays upon the road.

From the foregoing description, it will be seen that I have provided a simple anti-glare shield for direct attachment to the electric lamp of an automobile headlight, which will arrest the intense glare usually present therein under all conditions, without in any way affecting the light beam required for night driving.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claims.

What is claimed as new is:—

1. A glare shield for a vehicle lamp comprising spaced arms, a resilient loop integral with the rear ends of said arms for attaching the same to the base of a lamp adjacent its globe, a concave freely swingable shield for top and forward portions of a bulb of the lamp, a resilient stop rigid with the rear portion of said shield for contacting with the bulb to limit swinging movement of said shield in one direction, and a weight rigid with said shield and disposed therebelow for swingably retaining said shield in shielding position; said arms being journaled with respect to said shield for facilitating free swinging movement of said shield during travel of the vehicle.

2. A glare shield for vehicle headlight lamps comprising in combination with a bulb having a base and a globe, a pair of arms spaced from the globe, a rear resilient loop integral with said arms and embracing said base, a concave shield freely swingably positioned adjacent top and forward portions of said globe, said shield including a depending nose for exclusively shielding part of the bulb in front of the filament of the latter, resilient stop means carried on the rear part of the shield for limiting the swinging movement in one direction, a rigid arm carried by said shield, and a weight carried by the last mentioned arm and disposed below said globe for maintaining said shield in shielding position; said first mentioned arms having pivotal connection with the shield for facilitating free swinging movement of said shield during the travel of the vehicle.

In testimony whereof I have affixed my signature.

GEORGE BENDIXEN.